(12) United States Patent
Kim (10) Patent No.: US 9,798,296 B2
(45) Date of Patent: Oct. 24, 2017

(54) METHOD FOR CONTROLLING INVERTER

(71) Applicant: LSIS CO., LTD., Anyang-si, Gyeonggi-do (KR)

(72) Inventor: Hyo Jin Kim, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 601 days.

(21) Appl. No.: 14/328,259

(22) Filed: Jul. 10, 2014

(65) Prior Publication Data
US 2015/0185711 A1    Jul. 2, 2015

(30) Foreign Application Priority Data

Dec. 31, 2013   (KR) ........................ 10-2013-0168389

(51) Int. Cl.
| | | |
|---|---|---|
| G05D 7/00 | (2006.01) | |
| G05D 11/00 | (2006.01) | |
| F04B 49/06 | (2006.01) | |
| G05D 1/00 | (2006.01) | |
| G06F 7/00 | (2006.01) | |
| G06F 11/00 | (2006.01) | |
| G05B 11/36 | (2006.01) | |
| H02P 27/06 | (2006.01) | |
| F04B 17/03 | (2006.01) | |

(52) U.S. Cl.
CPC .............. *G05B 11/36* (2013.01); *F04B 17/03* (2013.01); *F04B 49/065* (2013.01); *H02P 27/06* (2013.01)

(58) Field of Classification Search
CPC ..................................................... G05B 11/36
See application file for complete search history.

(56) References Cited

U.S. PATENT DOCUMENTS

| | | | |
|---|---|---|---|
| 5,941,690 A | * | 8/1999 | Lin ....................... F04B 49/065 417/44.2 |
| 2004/0219025 A1 | | 11/2004 | Garcia-Ortiz |
| 2007/0248468 A1 | | 10/2007 | Holmberg |

(Continued)

FOREIGN PATENT DOCUMENTS

| | | |
|---|---|---|
| CN | 1974958 | 6/2007 |
| CN | 100511068 | 7/2009 |

(Continued)

OTHER PUBLICATIONS

The State Intellectual Property Office of the People's Republic of China Application Serial No. 201410575748.4, Office Action dated Dec. 22, 2015, 6 pages.

(Continued)

*Primary Examiner* — Mohammad Ali
*Assistant Examiner* — Md Azad
(74) *Attorney, Agent, or Firm* — Lee Hong Degerman Kang & Waimey (57) ABSTRACT

A method for controlling an inverter is provided, the method including, setting, as a first reference, a pressure data returned from the pressure sensor when a pre-PID ends, updating the first reference that is increased by a predetermined step to a second reference, determining an output frequency of the inverter by performing a PID control using the second reference, and determining an output frequency of the inverter by performing the PID using a third reference set up by the user when the second reference or feedback pressure data is equal to a set value.

6 Claims, 7 Drawing Sheets

(56) References Cited

U.S. PATENT DOCUMENTS

| | | | |
|---|---|---|---|
| 2010/0076658 A1 | 3/2010 | Liao et al. | |
| 2012/0235619 A1* | 9/2012 | Yun | F04B 49/06 318/452 |
| 2014/0044561 A1* | 2/2014 | Leiber | F04B 17/03 417/20 |

FOREIGN PATENT DOCUMENTS

| | | |
|---|---|---|
| CN | 201306269 | 9/2009 |
| CN | 201461354 | 5/2010 |
| JP | 02-067478 | 3/1990 |
| JP | 10-159743 | 6/1998 |
| JP | 2001-120432 | 5/2001 |
| JP | 2008-009838 | 1/2008 |
| JP | 2013-519815 | 5/2013 |
| JP | 2014-231823 | 12/2014 |

OTHER PUBLICATIONS

Japan Patent Office Application Serial No. 2014-159276, Office Action dated Jan. 26, 2016, 2 pages.
European Patent Office Application Serial No. 14177265.7, Search Report dated Sep. 14, 2015, 6 pages.
Japan Patent Office Application Serial No. 2014-159276, Office Action dated Aug. 4, 2015, 5 pages.

* cited by examiner

METHOD FOR CONTROLLING INVERTER

Pursuant to 35 U.S.C. §119 (a), this application claims the benefit of earlier filing date and right of priority to Korean Patent Application No. 10-2013-0168389, filed on Dec. 31, 2013, the contents of which are hereby incorporated by reference herein in their entirety.

BACKGROUND OF THE INVENTION

Field of the Invention

The present disclosure relates to a method for controlling an inverter.

Description of Related Art

Generally, when a pump is directly started for pump control, chances are that an excessive pressure is instantly applied to a pump pipe to damage the pump or a pipe connecting the pump to a water tank may be damaged.

In order to solve the aforementioned problem, a normal acceleration/deceleration is performed to a pre-PID (Proportional Integral Derivative) frequency, where a pre-PID delay time (so call "soft fill time") is maintained. When a feedback relative to a pressure is less than a pre-PID exit set up by a user, a normal PID control is performed after lapse of the pre-PID. When the pressure reaches the pre-PID frequency, the PID control is not performed during maintenance of the pre-PID soft fill time.

Figure 1A:
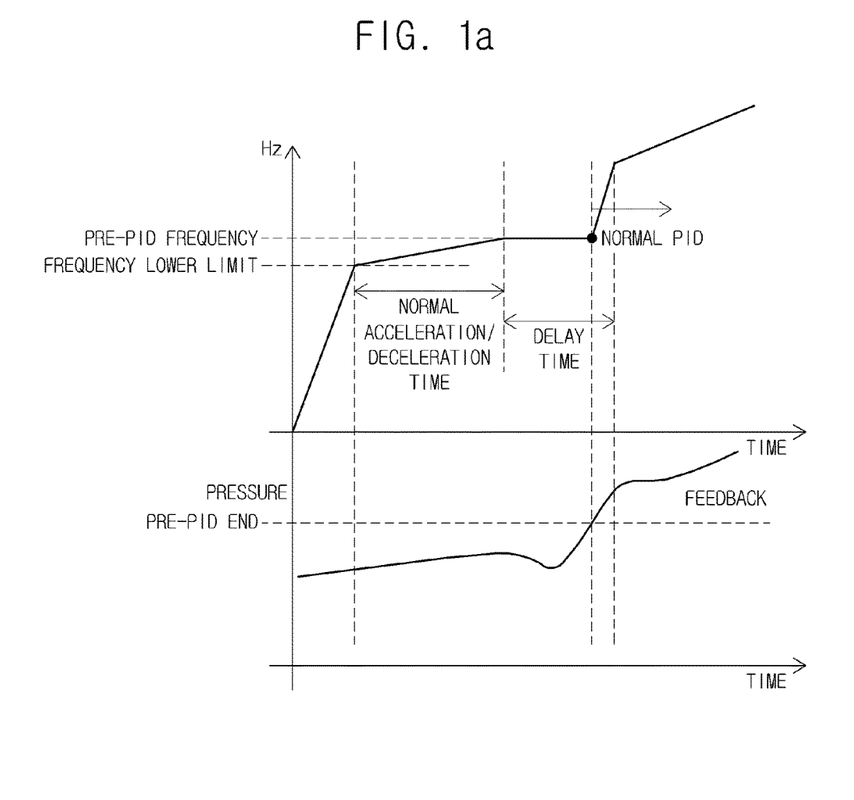
FIGS. 1a and 1b are exemplary views illustrating a conventional inverter control.
Figure 1B:
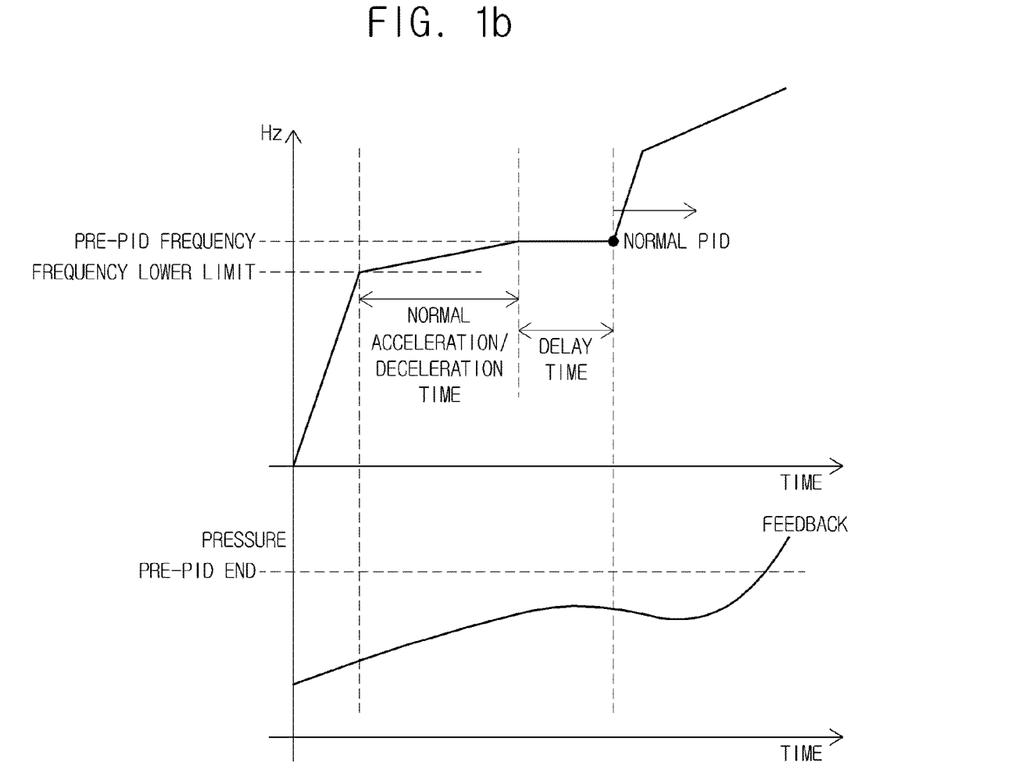

FIGS. 1a and 1b are exemplary views illustrating a conventional inverter control, where FIG. 1a is an exemplary view illustrating a case where feedback has reached a pre-PID soft fill time value before lapse of the pre-PID soft fill time in the pre-PID frequency, and FIG. 1b illustrates a case where the feedback is less than a pre-PID soft fill value even after maintenance of the pre-PID soft fill time.

Referring to FIG. 1a, it can be noted that a normal PID is performed when pressure data returned before end of the pre-PID soft fill time in the pre-PID frequency reaches a pre-PID soft fill value.

However, as shown in FIG. 1b, in a case a pressure data returned even after lapse of the pre-PID soft fill time has many differences over the pre-PID soft fill value, PID control burden rate increases when a normal PID starts to suddenly increase a PID output, and as a result, a pump damage by changes in sudden pump pressure cannot be disadvantageously prevented.

SUMMARY OF THE INVENTION

Exemplary aspects of the present disclosure are to substantially solve at least the above problems and/or disadvantages and to provide at least the advantages as mentioned below. Thus, the present disclosure is directed to provide a method for controlling inverter configured to prevent a pump from being damaged by sudden changes in pressure inside a pump during pump control. The present disclosure is also directed to provide a method for controlling inverter configured to prevent a pump from being damaged, because there is generated no big difference between a feedback pressure and a normally operable pump pressure set up by a user.

In one general aspect of the present invention, there is provided a method for controlling an inverter in a system including a pressure sensor configured to detect a pressure of a pump, a motor configured to drive the pump, and an inverter configured to drive the motor, the method comprising:

setting, as a first reference, a pressure data returned from the pressure sensor when a pre-PID ends;

updating the first reference by as much as a predetermined step to a second reference;

determining an output frequency of the inverter by performing a PID control using the second reference; and determining an output frequency of the inverter by performing the PID using a third reference set up by the user when the second reference or feedback pressure data is equal to a set value.

Preferably, but not necessarily, the method may further comprise updating the second reference by as much as a predetermined step to a fourth reference when a difference between the second reference and a pressure data returned from a relevant point is less than a set value after laps of a predetermined period.

Preferably, but not necessarily, the method may further comprise determining an output frequency of the inverter by performing a PID control using the fourth reference.

Preferably, but not necessarily, the method may further comprise updating the second reference to a reference of relevant period when a difference between the second reference and a pressure data returned from a relevant point is more than a set value after laps of a predetermined period.

Preferably, but not necessarily, the method may further comprise determining an output frequency by performing a PID control using the second reference.

Preferably, but not necessarily, the set value may be less than the third reference.

Advantageous Effects

According to the exemplary embodiment of the present disclosure, a soft fill PID is performed when a pressure data returned after a pre-PID delay fails to reach a soft fill set value. That is, update is made by periodically increasing an initial soft fill PID reference by a predetermined step only when a difference between a soft fill PID reference and returned pressure data is less than a set value, whereby a pump can be operated without a drastic change in pressure until reaching a normally operable pressure to prevent the pump from being damaged.

DETAILED DESCRIPTION OF THE INVENTION

Various exemplary embodiments will be described more fully hereinafter with reference to the accompanying drawings, in which some exemplary embodiments are shown.

The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Now, exemplary embodiments of the present disclosure will be explained in detail together with the accompanying drawings.

Figure 2:
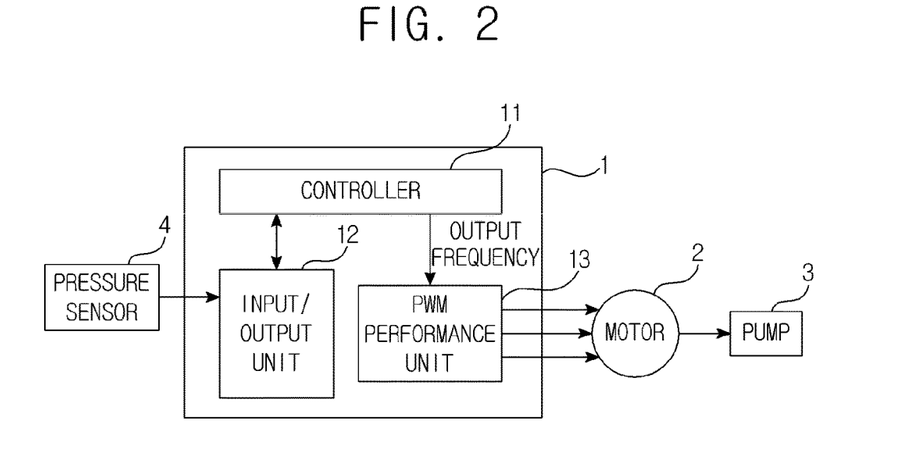
FIG. 2 is a block diagram illustrating an inverter system according to the present disclosure.

FIG. 2 is a block diagram illustrating an inverter system according to the present disclosure.

Referring to FIG. 2, the inverter system according to the present disclosure includes an inverter (1) and a motor (2) configured to receive a voltage of predetermined value and frequency from the inverter (1), where a pump (3) connected to the motor (2) is driven by the motor (2).

In general, a pump (3) is a machine configured to introduce liquid through an inlet and discharge the liquid through an outlet, and is driven by the motor (2). The configuration of a pump (3) is irrelevant to the present disclosure such that no more further detailed explanation thereto will be made.

A pressure sensor (4) is installed at a fluid path connected to the pump (3), and although the pressure sensor (4) is installed at an outlet, for example, an installed position of the pressure sensor (4) is not limited according to the present disclosure. That is, the pressure sensor (4) may be located at various positions. A pressure of the fluid path detected by the pressure sensor (4) may be used as a feedback for controlling an inverter according to the present disclosure.

Meanwhile, although the present disclosure has described the pressure of fluid path detected by the pressure sensor (4) as a feedback relative to state of the fluid path, the present disclosure is not limited thereto. That is, the present disclosure may use a value indicating a state of fluid path detected by various sensors including a fluid sensor as a feedback.

The inverter (1) according to the present disclosure may include a controller (11), an input/output unit (12) and a PWM (Pulse Width Modulation) performance unit (13). Although the inverter (1) of the present disclosure may include various elements other than the abovementioned elements, the various elements are irrelevant to the present disclosure and therefore omitted in explanation.

The input/output unit (12) may receive an output of the pressure sensor (4), converts the received output to a digital data and transmit the converted digital data to the controller (11). To this end, the input/output unit (12) may include an ADC (Analogue-to-Digital Converter). The controller (11) may receive data from the input/output unit (12) to generate an output frequency through PID control, and transmit a relevant output frequency to the PWM performance unit (13).

When the PWM performance unit (13) performs the PWM using the output frequency received from the controller (11) and provides an output thereof to the motor (2), the motor (2) is driven by the output. The PWM performance using an output frequency is well known to the skilled in the art such that no more detailed explanation will be made thereto.

Figure 3:
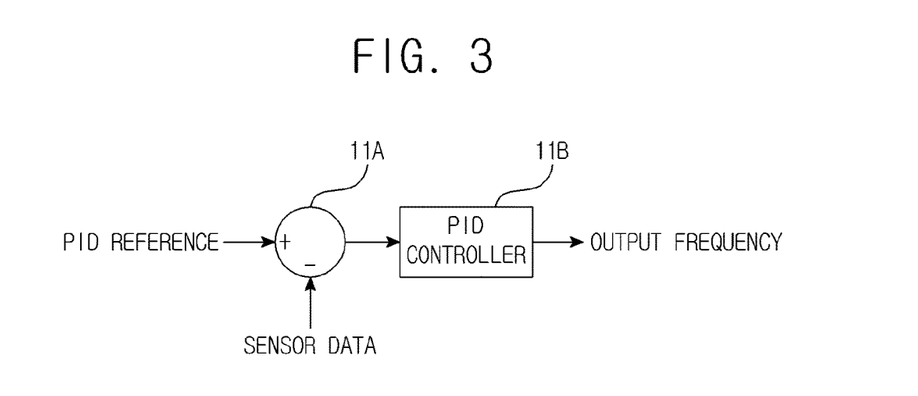
FIG. 3 is a detailed block diagram illustrating a controller according to an exemplary embodiment of the present disclosure.

FIG. 3 is a detailed block diagram illustrating a controller according to an exemplary embodiment of the present disclosure.

Referring to FIG. 3, the controller (11) may include an error generation unit (11A) and a PID controller (11B). The error generation unit (11A) generates an error of pressure data received from the PID reference and the input/output unit (12) and provides the error to the PID controller (11B), where the PID controller (11B) may output an output frequency of the PWM performance unit (13) by performing the PID control. The PID reference is set up by a user, inputted through an input unit (not shown) and is generally called a "pressure command". Now, operation of the controller (11) will be described with reference to the accompanying drawing.

Figure 4:
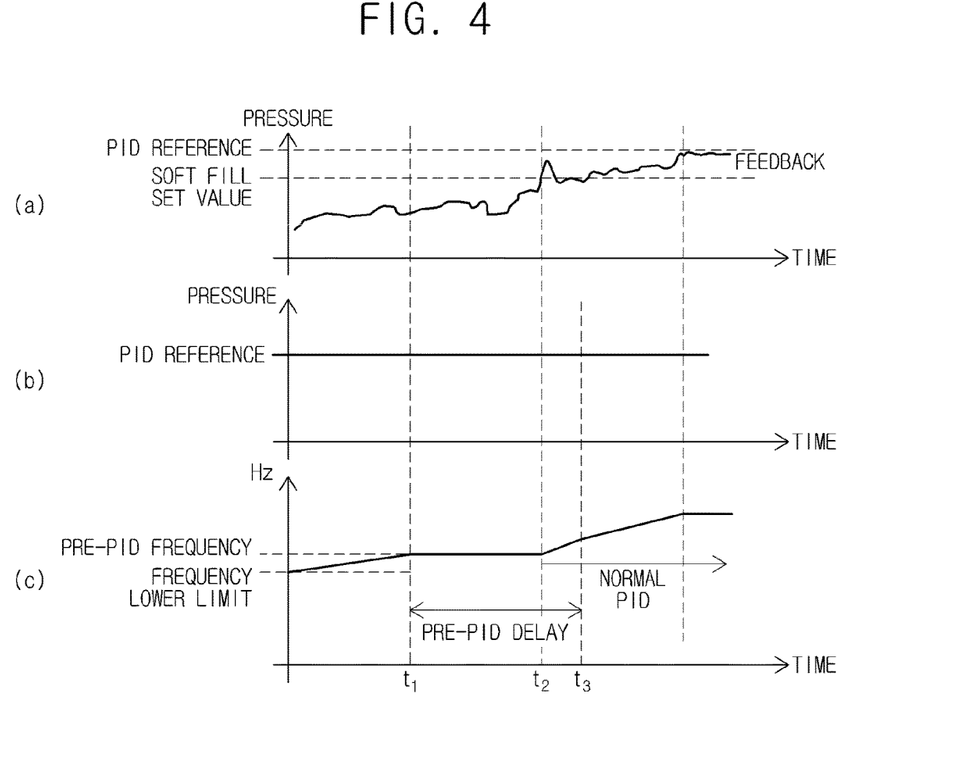
FIG. 4 is an exemplary view illustrating a method for controlling an inverter according to the present disclosure.

FIG. 4 is an exemplary view illustrating a method for controlling an inverter according to the present disclosure, where (a) illustrated a feedback of pressure data inputted through the pressure sensor (4) in time, (b) illustrates changes of PID reference in time, and (c) illustrates an output frequency of the controller (11). The exemplary embodiment of the present disclosure by FIG. 4 explains a case where a pressure data returned during pre-PID delay is more than a set value (soft fill set value).

Referring to FIG. 4, the controller (11) increases a frequency until reaching a pre-PID frequency at the beginning (0 to t1), and maintains the pre-PID frequency at the pre-PID delay time (t1 to t3), which is to allow the pump (3) to reach an operable pressure during pump operation. At this time, the controller (11) ascertains the feedback of sensor data and when the sensor data reaches the soft fill set value, a normal PID can be started even if the PID delay time is not finished (i.e., the normal PID performance can start at t2 which is earlier than t3).

Meantime, when the feedback of the pressure data is smaller than the soft fill set value even if the pre-PID delay time has finished, the controller (11) performs the PID control in order to increase to the soft fill set value, which is called hereinafter as a 'soft fill PID. That is, the soft fill PID is a PID control used to increase the pressure data returned from the pump (3) to the soft fill set value after end of the pre-PID delay time.

Figure 5:
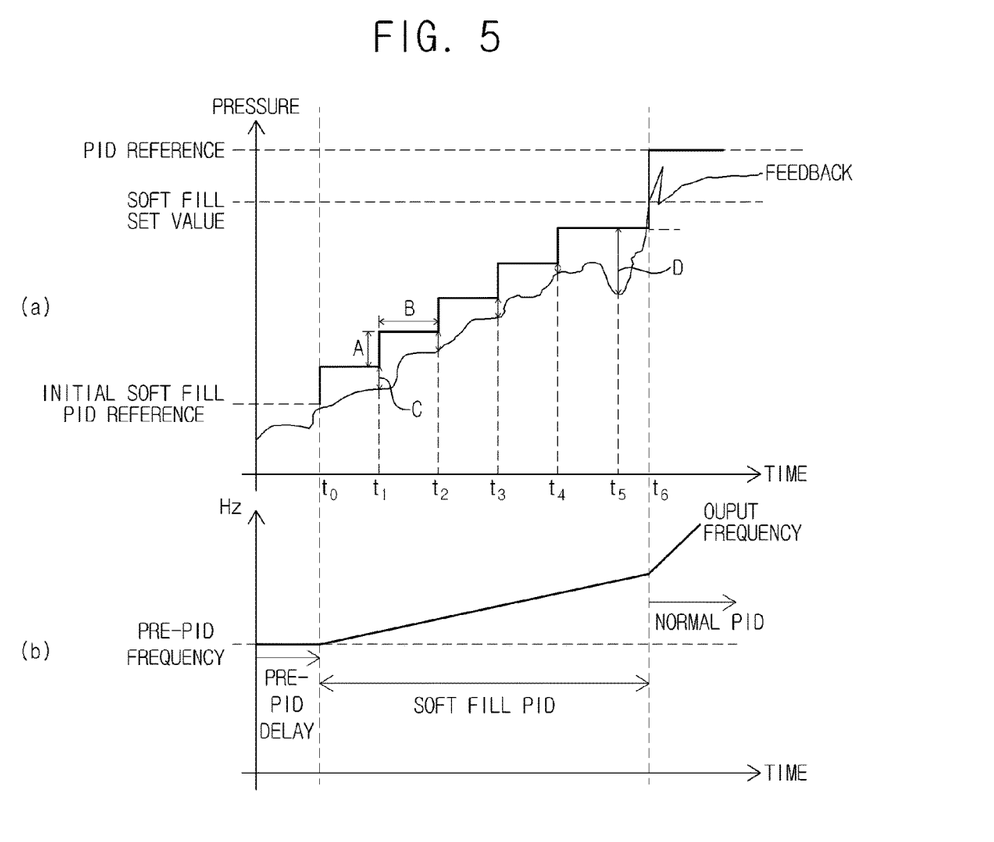
FIGS. 5 and 6 are other exemplary views illustrating a method for controlling an inverter according to the present disclosure.
Figure 6:
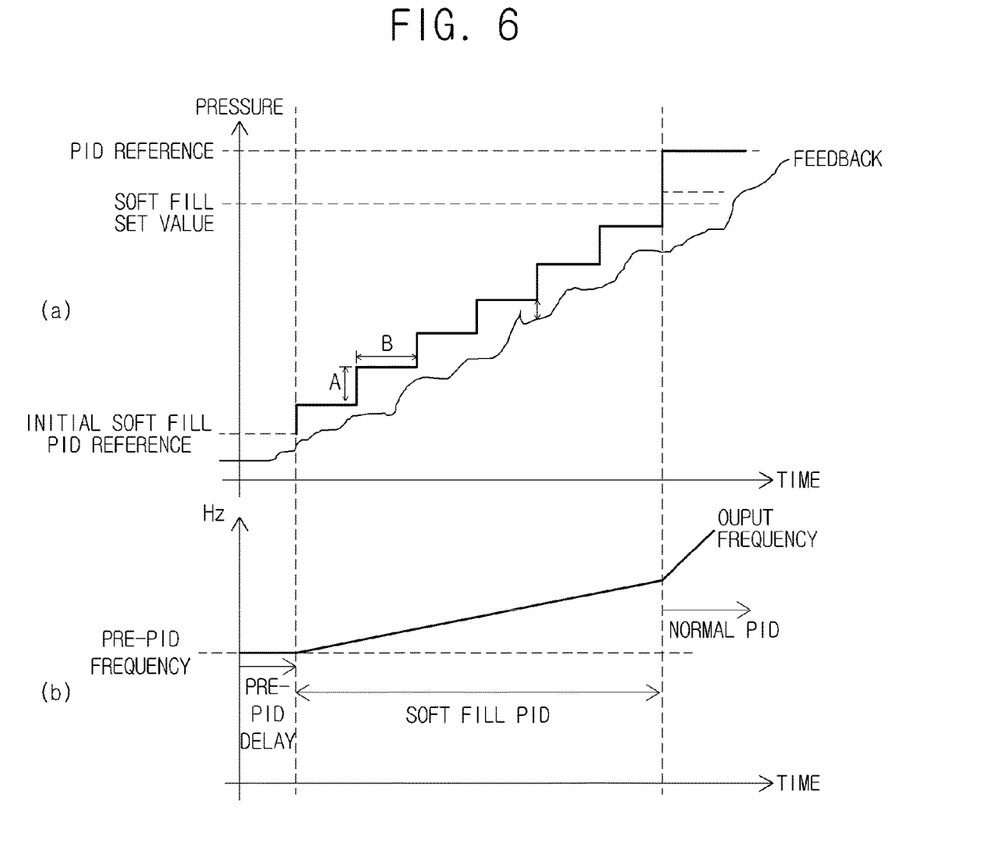

FIGS. 5 and 6 are other exemplary views illustrating a method for controlling an inverter according to the present disclosure, where (a) illustrates a pressure data that is returned, and (b) illustrates an output frequency of the controller (11).

In the exemplary embodiment of the present disclosure, a pressure data at the end point of pre-PID is defined as 'soft fill PID reference' when the feedback of pressure data is smaller than the soft fill set value even after the pre-PID has ended. At this time, the controller (11) according to the present disclosure can control the PID reference to slowly increase the returned pressure data to the soft fill set value, and the PID control at this time is defined as soft fill PID. The soft fill PID control according to the present disclosure starts when the pressure data returned after end of the pre-PID fails to reach the soft fill set value.

The controller (11) performs the PID control using the soft fill PID reference as an initial value. That is, the controller (11) may designate, as a new soft fill PID reference, a reference increased by a predetermined step (A) at each predetermined time (B) on the soft fill PID reference.

At this time, the controller (11), at lapse of predetermined time (B), ascertains a difference between a relevant soft fill PID reference and an actually returned pressure data, and newly designates a soft fill reference increased by A step for only a value less than a set value. That is, when an initial soft fill reference is designated at t0, a soft fill PID reference increased as much as A is used at t0 up to t1 (i.e., during B). When a difference (C) between a relevant soft fill PID reference (i.e., a value increased as much as A at the soft fill PID reference) and feedback pressure data is less than a set value, a new soft fill PID reference increased as much as A can be designated again at t1.

When a difference between the PID reference and the feedback data exceeds a set value as in t5 while re-designating a soft fill PID reference at every period as noted above, no further increase as much as A is made at next period, and a soft fill PID reference of relevant period may be used as it is until next period.

Successively, when a pressure data returned as in t6 reaches a soft fill set value, the controller (11) changes to a PID reference to perform a normal PID control.

In other words, FIG. 5 illustrates a case where a feedback pressure data during soft fill PID control has reached a set value, whereas FIG. 6 illustrates a case where the soft fill PID reference has reached a soft fill set value during soft fill PID control. As in FIG. 6, the controller (11) can update the soft fill PID reference by increasing from the initial soft fill PID reference at every period (B) by as much as a predetermined step (A), and can control a normal PID control when the soft fill PID reference reaches a soft fill set value.

Figure 7:
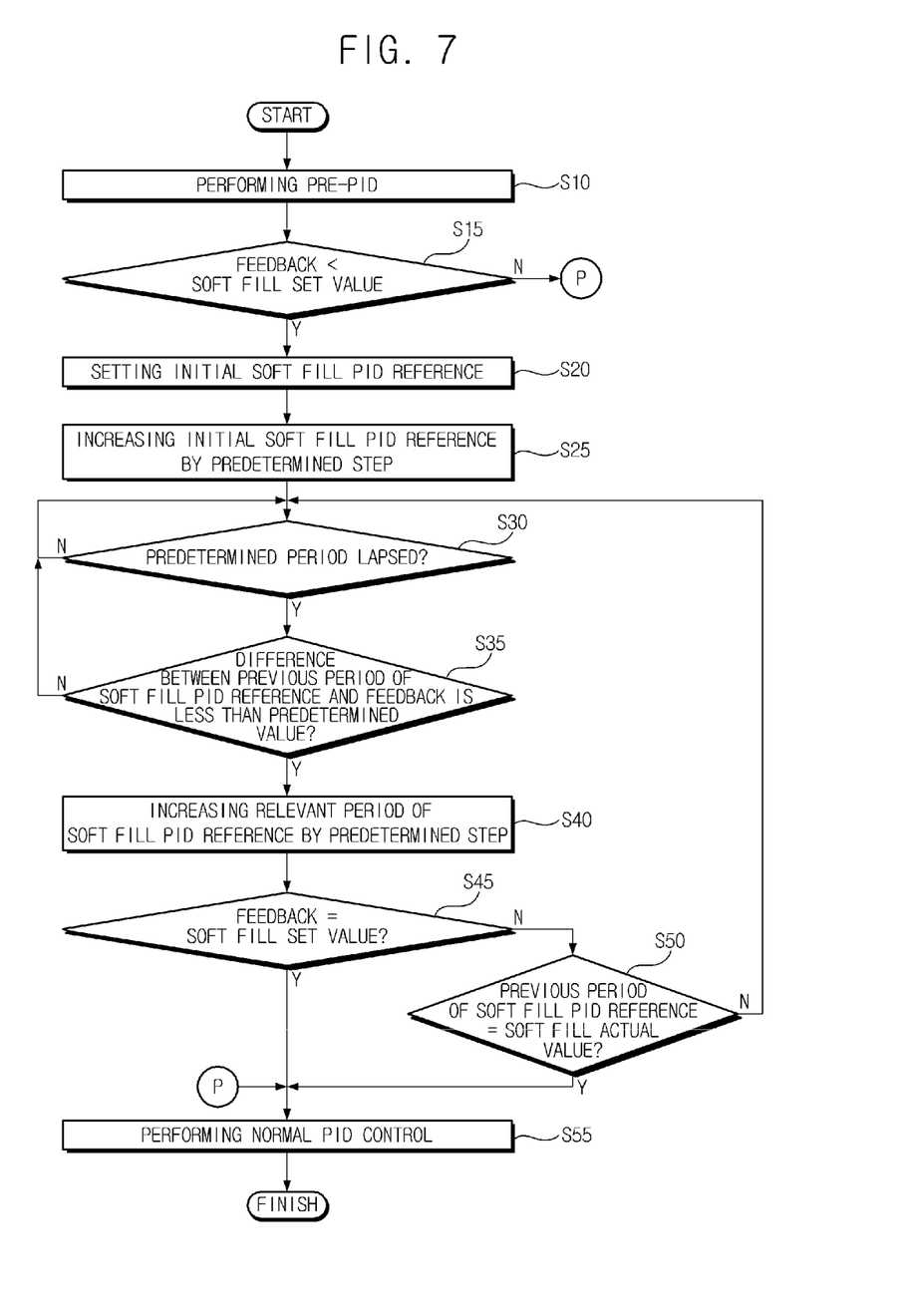
FIG. 7 is a flowchart illustrating a method for controlling an inverter according to an exemplary embodiment of the present disclosure.

FIG. 7 is a flowchart illustrating a method for controlling an inverter according to an exemplary embodiment of the present disclosure, where the PID reference may be set in advance by a user, and the controller (11) according to the present disclosure performs a soft fill PID, even if the pre-PID has finished while feedback pressure data is less than the soft fill set value.

Referring to FIG. 7, the controller (11) according to the present disclosure can immediately perform a normal PID control (S50) when the feedback pressure data grows greater than the soft fill set value (S15) while performing the pre-PID (S10). At this time, the pre-PID means the lapse of a pre-PID delay time where an output frequency increases up to a frequency lower limit and when the output frequency reaches the frequency lower limit, the pre-PID frequency is maintained after lapse of a normal acceleration/deceleration time up to the pre-PID delay time, as illustrated in FIGS. 1a and 1b. The pre-PID is well known to the skilled in the art such that no more detailed explanation thereto will be made hereinafter.

In the method for controlling an inverter according to the present disclosure, the pre-PID is defined as a soft fill set value that is smaller by a predetermined amount than the PID reference.

Meanwhile, when the feedback pressure data is smaller than a soft fill set value even after the pre-PID performance is finished (S15), the controller (11) sets a value of feedback pressure data when the pre-PID ends as 'initial soft fill PID reference' (S20), and updates to a soft fill PID reference (S25) at a relevant period by increasing an initial soft fill PID reference by a predetermined step (A) when the pre-PID ends.

Thereafter, when a predetermined period (B) lapses (S30), a soft fill PID reference of previous period may be increased by a predetermined step (A) to update to a soft fill PID reference (S40), only when a difference between the soft fill PID reference of previous period (because period has lapsed) and feedback pressure data when period lapses is less than a set value (S35). As a result of ascertainment at S35, if the difference between the soft fill PID reference of previous period and feedback pressure data of lapsed period is more than a set value, no increase by a predetermined step is made, and the soft fill PID reference of previous period may be updated to a soft fill PID reference of relevant period. The controller (11) may use the updated soft fill PID reference to perform a PID control (soft fill PID) and output an output frequency.

At this time, when the feedback pressure data and soft fill set value becomes equal (S45), a normal PID control may be performed (S55). Alternatively, even if the soft fill PID reference of relevant period becomes equal to the soft fill set value (S50), the normal PID control may be performed to output an output frequency capable of controlling the motor (2) (S55).

As apparent from the foregoing, the present disclosure can perform the soft fill PID, when the feedback pressure data after pre-PID delay fails to reach the soft fill set value. That is, the pump (3) can be prevented from being damaged through operation without sudden pressure change until the pump (3) reaches a normally operable pressure by update through periodic increase by a predetermined step at an initial soft fill PID reference, and through increase only when a difference between the soft fill PID reference and feedback pressure data is less than a set value.

The abovementioned embodiments are intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A method for controlling an inverter in a system including a pressure sensor configured to detect a pressure of a pump, a motor configured to drive the pump, and an inverter configured to drive the motor, the method comprising:
    setting, as a first reference, a pressure data returned from the pressure sensor when a pre-PID ends;
    updating to a second reference by increasing the first reference by a predetermined step;
    determining an output frequency of the inverter by performing a PID control using the second reference; and
    determining an output frequency of the inverter by performing the PID control using a third reference set up by a user when the second reference or feedback pressure data is equal to a set value,
    wherein the PID control starts when the pressure data returned after end of the pre-PID fails to reach the set value,
    wherein the first reference is updated periodically when a predetermined period lapses, and
    the first reference of a previous period is increased by the predetermined step to update to the second reference only when a difference between the first reference of the previous period and the feedback pressure data when a period lapses that is less than the set value.

2. The method of claim 1, further comprising updating to a fourth reference by increasing the second reference by the predetermined step when a difference between the second reference and a pressure data returned from a relevant point is less than the set value after lapse of the predetermined period.

3. The method of claim 2, further comprising determining an output frequency of the inverter by performing a PID control using the fourth reference.

4. The method of claim 1, further comprising updating the second reference to a reference of relevant period when a difference between the second reference and a pressure data returned from a relevant point is more than a set value after lapse of a predetermined period.

5. The method of claim 4, further comprising determining an output frequency by performing a PID control using the second reference.

6. The method of claim 1, wherein the set value is less than the third reference.

* * * * *